United States Patent
Kitamura et al.

(10) Patent No.: US 7,940,437 B2
(45) Date of Patent: May 10, 2011

(54) COMPUTER-GENERATED HOLOGRAM FOR RECONSTRUCTING A FULL-COLOR IMAGE WITH HIGH RESOLUTION AND ITS FABRICATION METHOD

(75) Inventors: Mitsuru Kitamura, Tokyo (JP); Akiko Kitamura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 895 days.

(21) Appl. No.: 11/848,395

(22) Filed: Aug. 31, 2007

(65) Prior Publication Data
US 2008/0057407 A1    Mar. 6, 2008

(30) Foreign Application Priority Data

Sep. 1, 2006   (JP) .............................. 2006-237581
Oct. 11, 2006   (JP) .............................. 2006-277455

(51) Int. Cl.
    *G03H 1/08*      (2006.01)
(52) U.S. Cl. ............................................. 359/9; 359/22
(58) Field of Classification Search .................. None
See application file for complete search history.

(56) References Cited

U.S. PATENT DOCUMENTS

| 4,037,919 | A  | * | 7/1977  | Takeda et al. ..................... 359/9 |
| 6,813,048 | B2 | * | 11/2004 | Kitamura .......................... 359/9 |
| 7,046,405 | B2 | * | 5/2006  | Kitamura et al. ................. 359/9 |

FOREIGN PATENT DOCUMENTS

JP      2000214751 A   *   8/2000

* cited by examiner

*Primary Examiner* — Arnel C Lavarias
(74) *Attorney, Agent, or Firm* — Sughrue Mion, PLLC

(57) ABSTRACT

A computer-generated hologram that is capable of reconstructing a full-color image and achieving a high resolution is provided. A recording plane of the hologram is divided by a multiplicity of parallel sections in the horizontal direction to define a multiplicity of areas. Amplitude information and phase information corresponding to different wavelengths which vary periodically in a direction traversing the multiplicity of areas, is recorded in the recording medium. Information about the same portion of the original image is recorded in individual points belonging to the same area, and information about another corresponding portion of the original image is recorded in individual points belonging to another area.

6 Claims, 12 Drawing Sheets

FIG. 11                            PRIOR ART
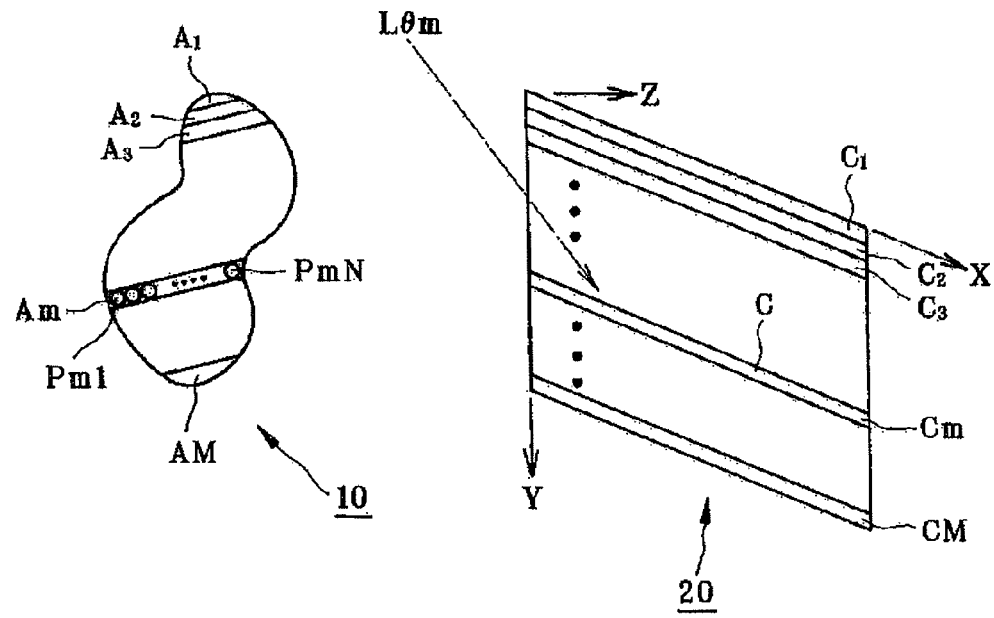
FIG. 12                            PRIOR ART
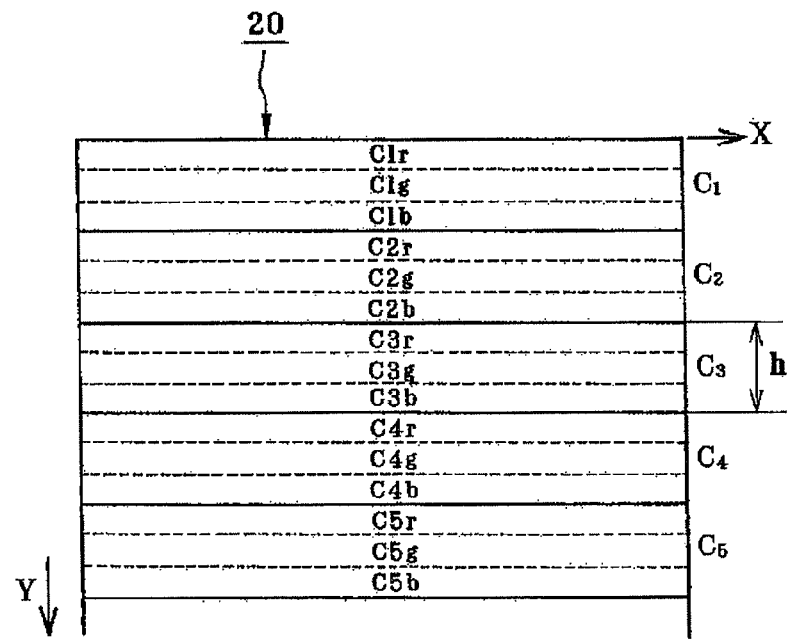

COMPUTER-GENERATED HOLOGRAM FOR RECONSTRUCTING A FULL-COLOR IMAGE WITH HIGH RESOLUTION AND ITS FABRICATION METHOD

BACKGROUND OF THE INVENTION

The present invention relates generally to a computer-generated hologram and its fabrication method, and more particularly to a computer-generated hologram capable of reconstructing a full-color image with high resolution, and its fabrication method.

Patent Publication 1 discloses a computer hologram (computer-generated hologram) capable of reconstructing a full-color image under white light and its fabrication method. In the computer hologram set forth in Patent Publication 1, a recording medium is divided into unit areas;

each unit area is divided into blocks corresponding to red, green and blue sub-areas;

point light sources bearing information about as many RGB colors as the unit areas are provided on the surface of a full-color original image; and information about colors corresponding to the point light sources bearing information about RGB colors is recorded in the red, green and blue sub-areas in the unit area.

The fabrication method of the prior art is now explained. FIG. 11 is a perspective view of one specific example of the holographic recording method described in Patent Publication 1. In that example, an original image 10 and a recording medium (recording plane) 20 are each horizontally divided by a multiplicity of parallel lines (parallel sections) to define a multiplicity of linear areas. More specifically, as shown in FIG. 11, the original image 10 is divided into a total of 3M unit areas A1, A2, A3, ..., Am, ..., AM, and the recording medium 20 is similarly divided into a total of 3M unit areas C1, C2, C3, ..., Cm, ..., CM. When the original image is a stereoscopic image, the respective unit areas A1, A2, A3, ..., Am, ..., AM are obtained by dividing the surface portion of the solid body. Here, the 3M unit areas on the original image 10 have one-to-one relations to the 3M unit areas on the recording medium 20. For instance, the area Am that is the $m^{th}$ on the original image 10 is corresponding to the $m^{th}$ unit area Cm on the recording medium 20.

And each of the individual unit areas A1, A2, A3, ..., Am, ..., AM on the original image 10 becomes a linear area having point light sources lining up in a row. Referring further to FIG. 11, for instance, the $m^{th}$ unit area Am has point light sources Pma1 to PmN lining up in a row. (Although depending on the shape of the object that defines the original image 10, the unit area Am is not always limited to one single line. For instance, if three spheres line up, the section takes on three spherical shapes wherein point light sources line up on the respective circles). As indicated by broken lines in FIG. 12, each unit area C1, C2, C3, ..., Cm, ..., CM are divided in three sub-areas. The sub-areas C1r, C2g, C1b here are corresponding to the sub-areas to which the unit area C1 shown in FIG. 11 is divided.

And then, interference fringes about a point of computation Q in any arbitrary unit area on the recording medium 20 are figured out as follows. Although Cmr is here selected as any arbitrary area, it is understood that the same may hold for Cmg and Cmb, too. First, the area Am on the original image 10 that corresponds to the area Cmr to which this point of computation Q belongs is determined as the unit area to be computed. Then, if interference fringes formed at the point of computation Q by synthetic light (object light) including the phase of object light Om1r to OmNr of color R emitted from the point light sources Pm1 to PmN in the unit area Am to be computed (when the area is Cmg or Cmb, there is object light Om1g to OmNg of color G or object light Om1b to OmNb of color B involved) and reference light L0mr of the same color R are found, it is possible to find interference fringes at the desired point of computation Q. The reference light L0mr here is a monochromatic parallel light ray parallel with the YZ plane. It is noted, however, that oblique light, not light parallel with the YZ plane, may just as well be used as the reference light L0mr.

FIG. 13 is a top view illustrative of the conception of such computation processing; it is illustrative of the original image 10 and recording medium 20 of FIG. 11 as viewed from above. As shown in FIG. 13, the necessary object light to find the interference fringes at the point of computation Q is limited to only Om1r, ..., Omir, ..., OmNr emitted out of the N point light sources Pm1, Pmi, ..., PmN in the area Am to be computed about the area Cmr of color R; only Om1g, ..., Omig, ..., OmNg emitted out of the N point light sources Pm1, ..., Pmi, ..., PmN in the area Am to be computed about the Cmg of color G; and only Om1b, ..., Omib, ..., OmNb emitted out of the N point light sources Pm1, ..., Pmi, ..., PmN in the area Am to be computed about the area Cmb of color B. In other words, there is no need of factoring in object light from all the point light sources that constitute the original image 10. Thus, if the respective given interference fringes are found about all the points of computation Q defined on the recording medium 20, one is going to obtain the inference fringe distribution on the recording medium 20.

FIG. 14 is a side view of the color original image recorded by such a method as mentioned above, which is under reconstruction. The recording medium 20 is irradiated with white illumination light Lw set in virtual illumination form (parallel light rays parallel with the YZ plane) at an angle α. The areas C1r, C1g, C1b lying at an upper site of the recording medium 20 here are recorded therein with information about the respective color components R, G, B of P1 (a set of P11, ..., Pli, ..., P1N is represented by the point light source P1; the same will hold for Pm, PM, too); upon reconstruction, however, reconstructing light for each color component is going to travel in the direction of a virtual point of view E. This will also apply to reconstructing light from the areas Cmr, Cmg, Cmb lying at about the middle of the recording medium 20, and reconstructing light from the areas CMr, CMg, CMb lying at a lower site of the recording medium 20. It follows that if the point of view is placed at the virtual point of view E, reconstructing light for the colors R, G, B about the respective point light sources P1 will be obtained from the areas C1r, C1g, C1b; reconstructing light for the colors R, G, B about the respective point light sources Pm will be obtained from the areas Cmr, Cmg, Cmb; and reconstructing light for the colors R, G, B about the respective point light sources PM will be obtained from the areas CMr, CMg, CMb. Consequently, the color original image 10 constructed of the point light sources P1, ..., Pm, ..., PM will be viewed with high color reproducibility.

FIG. 15 is illustrative in schematic of how to fabricate the computer hologram proposed in Patent Publication 1, and what is implicated in FIG. 15 is now explained because it is important for the explanation of the fabrication method according to the invention. As already noted, the original image (object) 10 is divided into a multiplicity of linear unit areas A1, A2, A3, ..., Am, ..., AM in the horizontal direction, and the recording medium 20, too, is divided into a multiplicity of linear unit areas C1, C2, C3, ..., Cm, ..., CM in the horizontal direction, corresponding to the unit areas A1, A2, A3, . . . , Am, . . . , AM on the original image (object) 10. And, each unit area C1, C2, C3, . . . , Cm, . . . , CM on the recording medium 20 is divided into three sub-areas as indicated by Cmr, Cmg, Cmb as an example. When the width or pitch of the unit areas A1, A2, A3, . . . , Am, . . . , AM on the original image (object) 10 is h, the corresponding width or pitch of the unit areas C1, C2, C3, . . . , Cm, . . . , CM on the recording medium 20 is h. This is implicated by FIG. 15.

Patent Publication 1
JP (A) 2000-214751
Patent Publication 2
JP (A) 2002-72837
Patent Publication 3
JP (A) 2005-215570
Patent Publication 4
JP (A) 2004-309709
Patent Publication 5
JP (A) 2004-309709
Non-Patent Publication 1
"99-3D Image Conference '99", a CD-ROM version of lecturing monographs (at the Shinjuku schoolhouse, Kogakuin University), an article entitled "Image-type binary CGH by means of EB lithography (3)—Enhancement of 3D effect with hidden surface removal and shading—"
Non-Patent Publication 2
Junpei Tujiuci, "Holography", pp. 33-36 (published by Shokabo Publishing Co., Ltd. on Nov. 5, 1997)

If a computer-generated hologram is fabricated by the fabrication method of the aforesaid Patent Publication 1, it is then possible to reconstruct a full-color image with good color reproducibility under white light.

A problem with that method is, however, that in an attempt to record an object having a finer structure on a recording medium, the finer the structure of the object, the finer it is needed to make the unit areas. In other words, once the width of the unit areas provided on the recording medium has been determined, the resolution is limited to that width.

SUMMARY OF THE INVENTION

In view of such problems with the prior art, an object of the invention is to provide a computer-generated hologram that is capable of reconstructing a full-color image and has a resolution higher than ever before.

According to the invention, the aforesaid object is achievable by the provision of a method of fabricating a computer-generated hologram with amplitude information and phase information recorded on a given recording plane by computer-aided computation, characterized by involving:

a step of defining a given original image and a recording plane for recording said original image;

a step of dividing said original image and said recording plane by a multiplicity of parallel sections into a multiplicity of linear areas in a horizontal direction, thereby defining said areas in such a way that areas of said original image have a one-to-one matching relation to areas of said recording plane;

a step of periodically arranging on the multiplicity of areas of said original image a point or line segment light source array emitting light having a plurality of different wavelengths in such a way that a wavelength of light emitted out of each area in a direction traversing the multiplicity of areas of said original image varies periodically depending on the areas;

a step of defining a multiplicity of computation points on the areas of said recording plane to compute amplitude information and phase information about object light on individual computation points, wherein said object light is synthetic light arriving from corresponding points of the areas of said original image or individual point or line segment light sources of said point or line segment light source array; and a step of recording on a recording medium amplitude information and phase information found on the individual computation points.

In this case, at the step of recording on the recording medium the amplitude information and phase information found on the individual computation points, interference fringes of object light and reference light at the computation points may be recorded on the recording medium, or the phase may be recorded with the depth of a groove in a three-dimensional cell having said groove in one surface while the amplitude may be recorded with the width of said groove.

In a typical aspect of the invention, the plurality of wavelengths of light emitted out of the point or line segment light source array periodically arranged on the multiplicity of areas of said original image is three, one for red, another for green, and yet another for blue.

The invention also includes a computer-generated hologram fabricated by the aforesaid method of fabricating a computer-generated hologram.

Further, the invention provides a computer-generated hologram in which amplitude information and phase information about a color original image expressed by a plurality of wavelengths is recorded on a given recording medium making use of computer-aided computation, characterized in that:

a recording plane of the hologram is divided by a multiplicity of parallel sections in a horizontal direction to define a multiplicity of linear areas thereon;

there are amplitude information and phase information recorded, which are corresponding to wavelengths varying periodically in a direction traversing the multiplicity of areas;

when reconstructed by given illumination, reconstructing light of periodically varying wavelengths diffracted from the amplitude information and phase information recorded in each area travels in such a direction as to be viewed at a point-of-view position that is a given position with respect to the recording plane of the hologram; and information about the same portion of the original image is recorded in individual points belonging to the same area while information about a corresponding different portion of the original image is recorded in individual points belonging to a different area.

In this case, the amplitude information and phase information recorded in the respective areas may be recorded in the form of interference fringes of object light and reference light, or the phase may be recorded with the depth of a groove in a three-dimensional cell having said groove in one surface while the amplitude may be recorded with the width of said groove.

Preferably, the periodically different wavelengths recorded in the areas is three, one for red, another for green, and yet another for blue.

Further, the present invention includes such computer-generated holograms as set out below.

(1) A computer-generated hologram, which has a complex amplitude of object light recorded therein, and is capable of selectively reconstructing a plurality of images depending on a viewing direction, characterized in that a virtual point light source group is spatially provided on a side of the hologram facing away from a viewing side of the hologram and a multiplicity of parallel slice planes traversing a plane of the virtual point light source group and a plane of the hologram are provided; light having a plurality of different wavelengths varying periodically in a direction orthogonal to the slice planes is assigned to the multiplicity of slice planes; in each slice plane, light diverging from virtual point light sources is allowed to have the assigned wavelengths; an angle profile of luminance of divergent light that diverges from the respective virtual point light sources in the virtual point light source group in the slice planes toward the viewing side in the slice planes is divided into angles; in each angle, there is divergent light that diverges in the slice planes from a point having a density of a wavelength corresponding to pixels of separate images positioned at the plane of the virtual point light source group at the virtual point light source position or an amplitude equal to a value having a constant relation to said density, so that divergent light set equal to said divergent light is recorded as object light at any position of the side of the virtual point light source group on which the divergent light is incident.

(2) A computer-generated hologram, which has a complex amplitude of object light recorded therein, and is capable of selectively reconstructing a plurality of images depending on a viewing direction, characterized in that a virtual collective point group is spatially provided on a side of the hologram facing away from a viewing side of the hologram and a multiplicity of parallel slice planes traversing a plane of the virtual collective point group and a plane of the hologram are provided; light having a plurality of different wavelengths varying periodically in a direction orthogonal to the slice planes is assigned to the slice planes; in each slice plane, light collecting on virtual collective points is allowed to have the assigned wavelengths; a angle profile of luminance of convergent light that is incident on the respective virtual collective points in the virtual collective point group in the slice planes from the side of the hologram facing away from the viewing side of the hologram in the slice planes is divided into angles; in each angle, there is convergent light that converges in the slice plane on a point having a density of a wavelength corresponding to pixels of separate images positioned at the plane of the virtual collective point group at a virtual collective point position or an amplitude equal to a value having a constant relation to said density, so that convergent light set equal to said convergent light is recorded as object light at any position of the side of the virtual collective point group on which the convergent light is incident.

(3) A computer-generated hologram, which has a complex amplitude of object light recorded therein and is capable of reconstructing a stereoscopic object, characterized in that a virtual point light source group is spatially provided on a side of the hologram facing away from a viewing side of the hologram and a multiplicity of parallel slice planes traversing a plane of the virtual point light source group and a plane of the hologram are provided; light having a plurality of different wavelengths varying periodically in a direction orthogonal to the slice planes is assigned to the multiplicity of slice planes; in each slice plane, light diverging from virtual point light sources is allowed to have the assigned wavelengths; an angle profile of luminance of divergent light that diverges from the individual virtual point light sources in the virtual point light source group in the slice planes toward the viewing side of the hologram in the slice planes is set equal to an angle profile of luminance of a corresponding wavelength on the surface of an object to be recorded when said virtual point light sources are viewed from the viewing side of the hologram in the slice planes; and divergent light that diverges from the individual virtual point light sources is mutually superposed on itself and recorded as object light at any position on the viewing side of the virtual point light source group.

(4) A computer-generated hologram, which has a complex amplitude of object light recorded therein and is capable of reconstructing a stereoscopic object, characterized in that a virtual collective point group is spatially provided on the viewing side of the hologram and a multiplicity of parallel slice planes traversing a plane of the virtual collective point group and a plane of the hologram are provided; light having a plurality of different wavelengths varying periodically in a direction orthogonal to the slice planes is assigned to the multiplicity of slice planes; in each slice plane, light diverging from virtual collective points is allowed to have the assigned wavelengths; an angle profile of luminance of convergent light that is incident on the individual virtual collective points in the virtual collective point group in the slice planes from the side of the hologram facing away from the viewing side of the hologram is set equal to an angle profile of luminance of a corresponding wavelength on the surface of an object to be recorded when viewed in the slice planes from the viewing side of the hologram through said virtual collective points; and convergent light that is incident on the individual virtual collective points is mutually superposed on itself and recorded as object light at any position on a side of the virtual collective point group facing away from a viewing side thereof.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 11 is a perspective view of a prior art method of recording a computer-generated hologram.

FIG. 12 is a plan view illustrative of in what state each unit area on the recording medium is divided into three blocks in the prior art.

DESCRIPTION OF THE PREFERRED EMBODIMENTS

Figure 1:
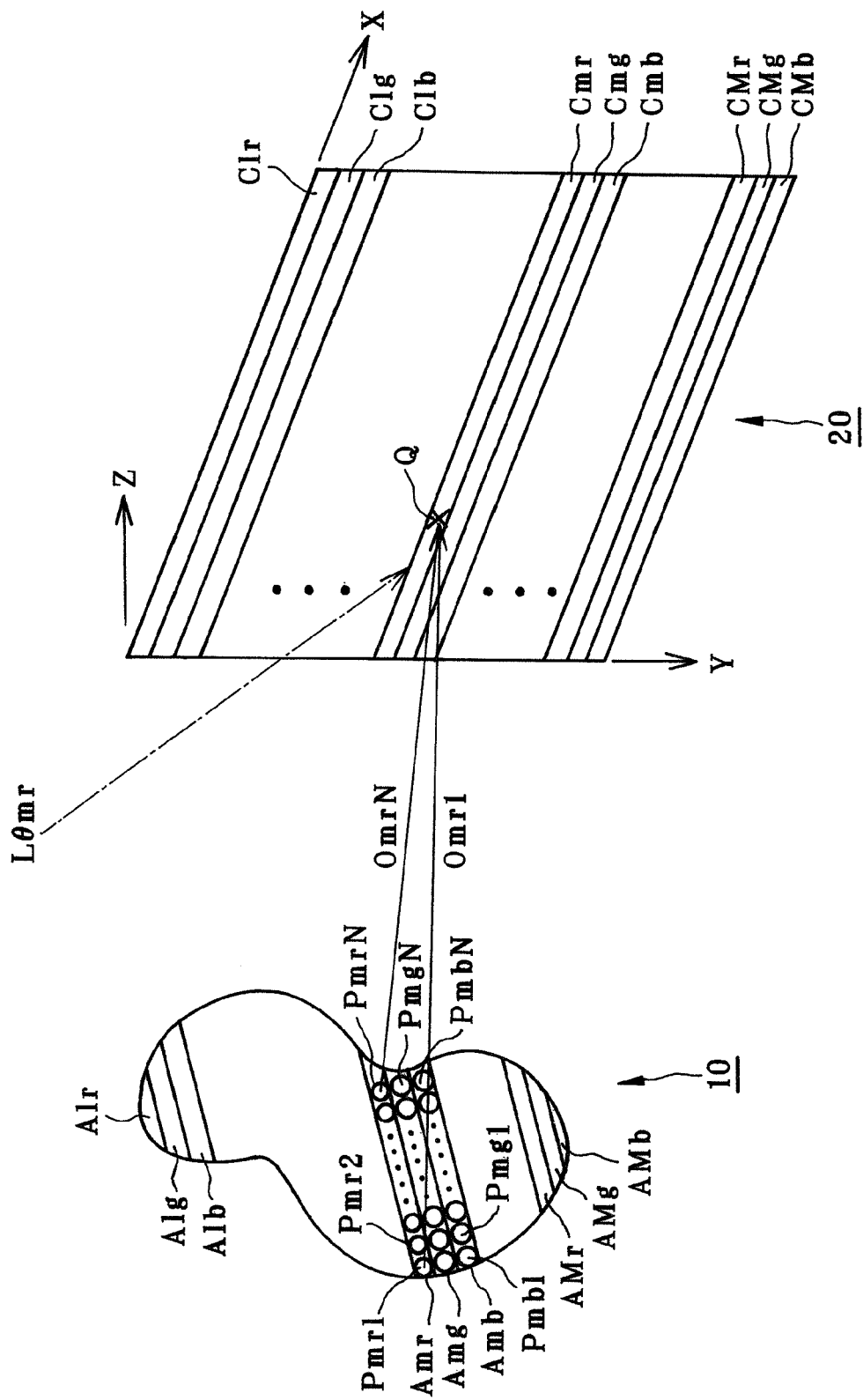
FIG. 1 is a perspective view of one example of the conception of recording a computer-generated hologram according to the invention.

Embodiments of how to fabricate the computer-generated hologram (CGH) of the invention, and embodiments of the computer-generated hologram (CGH) obtained by the computer-generated hologram fabrication method of the invention are now explained with reference to the drawings. FIG. 1 is illustrative in perspective of one embodiment of the conception of recording the computer-generated hologram according to the invention. In the embodiment here, an original image 10 and a recording medium (recording surface) 20 are each horizontally divided by a multiplicity of parallel lines (parallel sections) to define a multiplicity of linear areas. More specifically, as shown in FIG. 1, the original image 10 is divided into a total of 3M areas A1r, A1g, A1b, A2r, A2g, A2b, . . . , Amr, Amg, Amb, . . . , AMr, AMg, AMb, and the recording medium 20 is similarly divided into a total of 3M areas C1r, C1g, C1b, C2r, C2g, C2b, . . . , Cmr, Cmg, Cmb, . . . , CMr, CMg, CMb. When the original image 10 is a stereoscopic image, the respective areas A1r, A1g, A1b, A2r, A2g, A2b, . . . , Amr, Amg, Amb, . . . , AMr, AMg, AMb are obtained by dividing the surface portion of the solid body. Here, the 3M areas on the original image 10 have one-to-one relations to the 3M areas on the recording medium 20. For instance, the area Amr that is the first area at the recurring number $m^{th}$ for r, g and b (the $mr^{th}$ area) on the original image 10 is corresponding to the area Cmr that is at the first area at the recurring number $m^{th}$ for r, g and b on the recording medium 20.

Each of the individual areas A1r, A1g, A1b, A2r, A2g, A2g, . . . , Amr, Amg, Amb, . . . , AMr, Amg, Amb on the original image 10 becomes a linear area having point light sources lining up in a row. Referring here to FIG. 1, for instance, the $mr^{th}$ area Amr has point light sources Pmar1 to PmrN lining up in a row, which emit light of N colors R (red) in a fan form in a plane including the areas Amr and Cmr. Similarly, the $mg^{th}$ area Amg has point light sources Pmg1 to PmgN lining up in a row, which emit light of N colors G (green) in a fan form in a plane including the areas Amg and Cmg, and the $mb^{th}$ area Amb has point light sources Pmb1 to PmbN lining up in a row, which emit light of N colors B (blue) in a fan form in a plane including the areas Amb and Cmb.

And then, interference fringes about a point of computation Q in any arbitrary area on the recording medium 20 are figured out as follows. Although Cmr is here selected as any arbitrary area, it is understood that the same may hold for Cmg and Cmb, too. First, the area Amr on the original image 10 that corresponds to the area Cmr to which this point of computation Q belongs is determined as the area to be computed. Then, if interference fringes formed at the point of computation Q by synthetic light (object light) including the phase of object light Omr1 to OmrN of color R emitted from the point light sources Pmr1 to PmrN in the area Amr to be computed and divided (when the area is Cmg or Cmb, there is object light Omg1 to OmgN of color G or object light Omb1 to OmbN of color B involved) and reference light L0mr of the same color R are found, it is possible to find interference fringes at the desired point of computation Q. The reference light L0mr here is a monochromatic parallel light ray parallel with the YZ plane. It is noted, however, that oblique light, not light parallel with the YZ plane, may just as well be used as the reference light L0mr.

Figure 2:
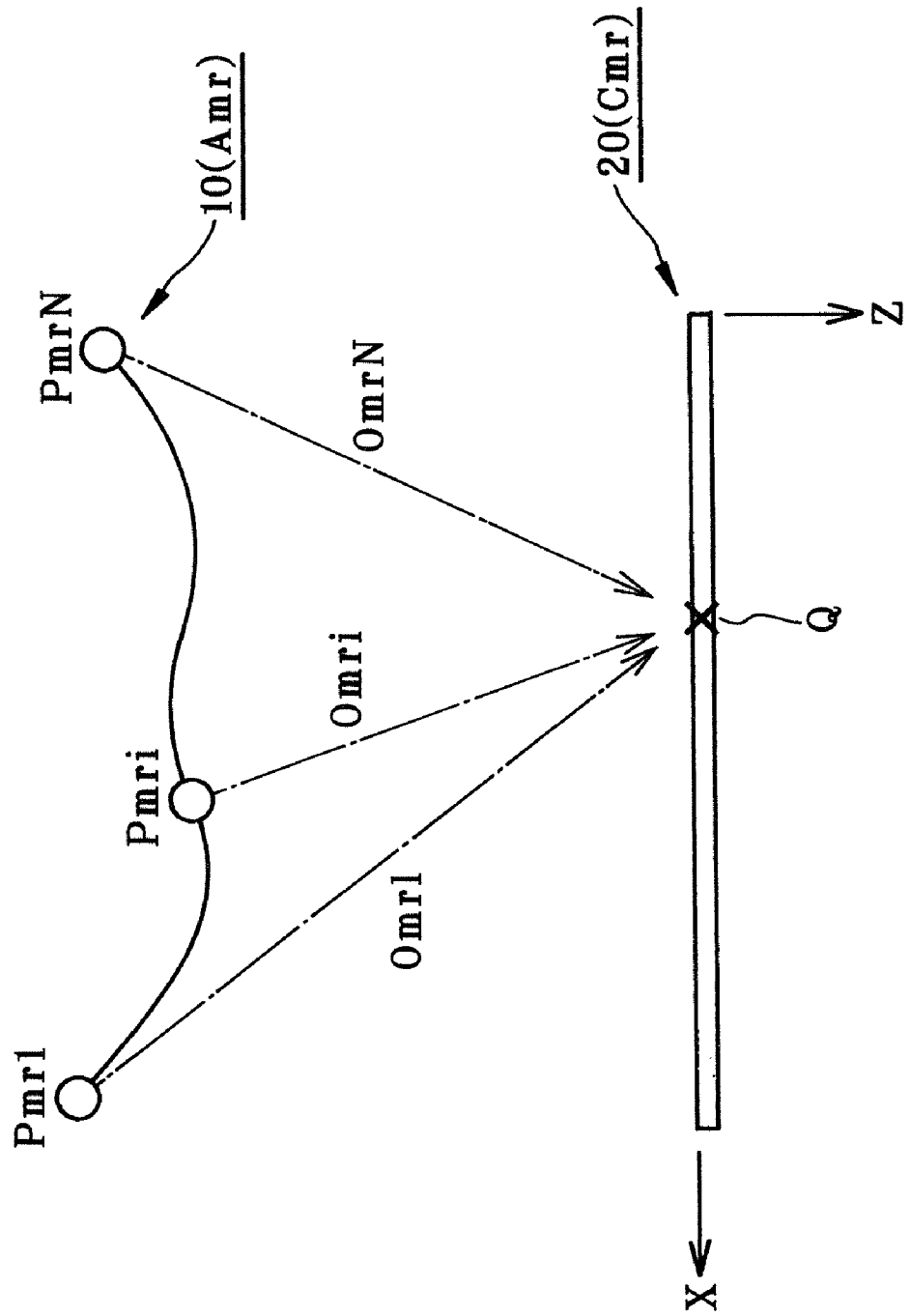
FIG. 2 is a top view for the conception of computation processing in FIG. 1.

FIG. 2 is a top view illustrative of the conception of such computation processing; it is illustrative of the original image 10 and recording medium 20 of FIG. 1 as viewed from above. As shown in FIG. 2, the necessary object light to find the interference fringes at the point of computation Q is limited to Omr1, . . . , Omri, . . . , OmrN emitted out of the N point light sources Pmr1, . . . , Pmri, . . . , PmrN in the area Amr to be computed about the area Cmr of color R; Omg1, . . . , Omgi, . . . , OmgN emitted out of the N point light sources Pmg1, . . . , Pmgi, . . . , PmgN in the area Amg to be computed about the Cmg of color G; and Omb1, . . . , Ombi, . . . , OmbN emitted out of the N point light sources Pmb1, . . . , Pmbi, . . . , PmbN in the area Amb to be computed about the area Cmb of color B. In other words, there is no need of factoring in object light from all the point light sources that constitute the original image 10. Thus, if the respective given interference fringes are found about all the points of computation Q defined on the recording medium 20, one is going to obtain the inference fringe distribution on the recording medium 20.

With such a recording method as described above, it is ensured that on the original image 10 there are M recurring units arranged side by side wherein each recurring unit comprises an array of point light sources of three colors RGB (point light sources Pmr1 to PmrN, Pmg1 to PmgN and Pmb1 to PmbN) whereas, on the recording medium 20, there are correspondingly M recurring units arranged side by side wherein each recurring unit comprises the areas Amr, Amg and Amb with interference fringes of colors RGB recorded in them, respectively.

Figure 3:
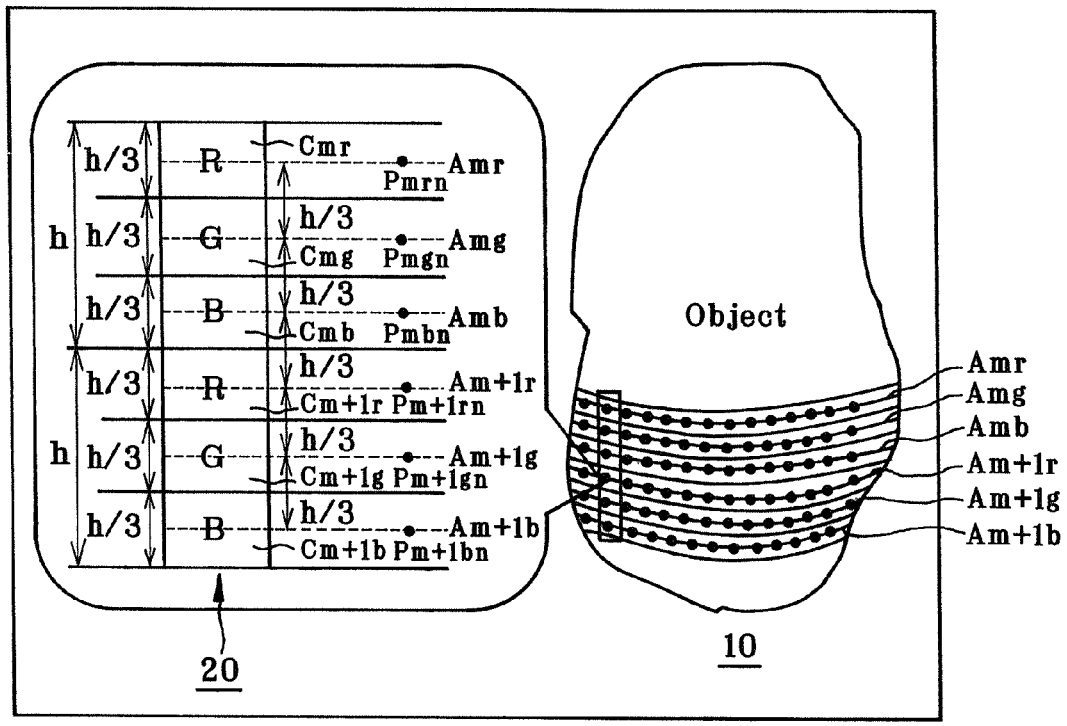
FIG. 3 is illustrative in schematic of how to fabricate the computer-generated hologram of the invention in FIG. 1 and FIG. 2.

FIG. 3 is illustrative in schematic of the fabrication method for the computer-generated hologram according to the aforesaid embodiment. As described above, the original image (object) 10 is divided into a multiplicity of horizontally linear areas A1r, A1g, A1b, A2r, A2g, A2b, . . . , Amr, Amg, Amb, . . . , AMr, AMg, AMb, and the recording medium 20, too, is divided into a multiplicity of horizontally linear areas C1r, C1g, C1b, C2r, C2g, C2b, . . . , Cmr, Cmg, Cmb, . . . , CMr, CMg, CMb, corresponding to the areas A1r, A1g, A1b, A2r, A2g, A2b, . . . , Amr, Amg, Amb, . . . , AMr, Amg, Amb on the original image (object) 10. When the width or pitch of the areas A1r, A1g, A1b, A2r, A2g, A2b, . . . , Amr, Amg, Amb, . . . , AMr, AMg, AMb on the original image (object) 10 is h/3, the width or pitch of the areas C1r, C1g, C1b, C2r, C2g, C2b, . . . , Cmr, Cmg, Cmb, . . . , CMr, CMg, CMb on the recording medium 20 is similarly h/3. And then, the RGB recurring pitch on the recording medium 20 becomes h/3× 3=h.

Figure 4:
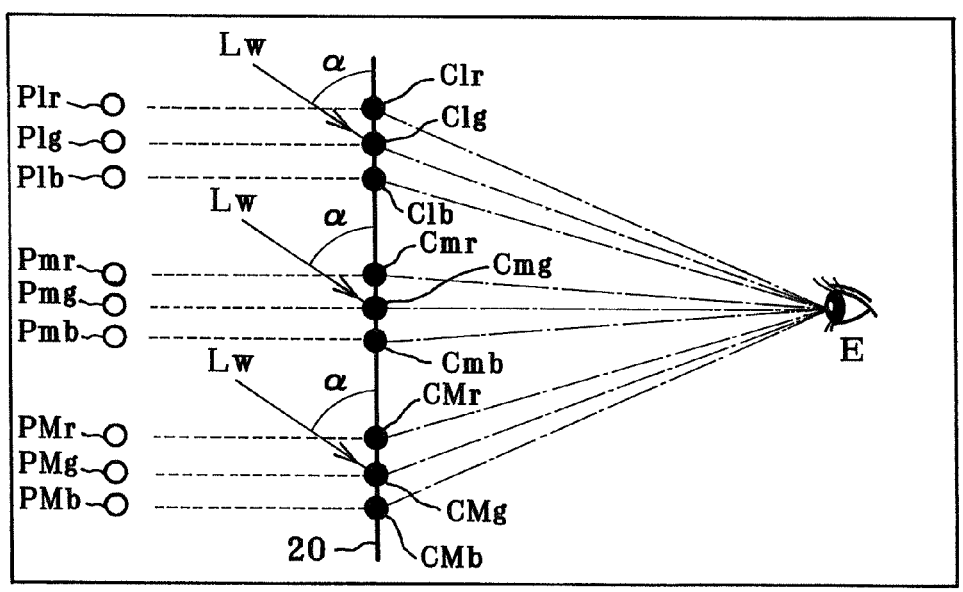
FIG. 4 is a side view of the color original image recorded by the method of FIG. 1, which is under reconstruction.

FIG. 4 is a side view of the color original image recorded by such a method as mentioned above, which is under reconstruction. The recording medium 20 is irradiated with white illumination light Lw set in virtual illumination form (parallel light rays parallel with the YZ plane) at an angle α. The areas C1r, C1g, C1b lying at an upper site of the recording medium 20 here are recorded therein with the respective colors R, G, B of P1r (a set of P1r1, . . . , P1ri, . . . , P1rN is represented by the point light source P1r; the same will hold for P1g, P1b, etc., too), P1g and P1b; upon reconstruction, however, reconstructing light for each color component travels in a direction of allowing the viewer to view the recording plane of the hologram at a point of view E that is a given position, as shown in FIG. 4. This will also apply to reconstructing light from the areas Cmr, Cmg, Cmb lying at about the middle of the recording medium 20, and reconstructing light from the areas CMr, CMg, CMb lying at a lower site of the recording medium 20. It follows that if the point of view is placed at the virtual point of view E, reconstructing light for the colors R, G, B about the respective point light sources P1r, P1g, P1b will be obtained from the areas C1r, C1g, C1b; reconstructing light for the colors R, G, B about the respective point light sources Pmr, Pmg, Pmb will be obtained from the areas Cmr, Cmg, Cmb; and reconstructing light for the colors R, G, B about the respective point light sources PMr, PMg, PMb will be obtained from the areas CMr, CMg, CMb. Consequently, the color original image 10 constructed of the point light sources P1r, P1g, P1b, . . . , Pmr, Pmg, Pmb, . . . , PMr, PMg, PMb will be viewed with high color reproducibility. If the virtual point of view E is a lot more away from the recording medium 20, it will allow the reconstructing light to travel in a direction of the normal to the plane of the recording medium 20.

Next, the method of fabricating the computer-generated hologram (CGH) as described above is now explained with reference to the flowchart.

Figure 5:
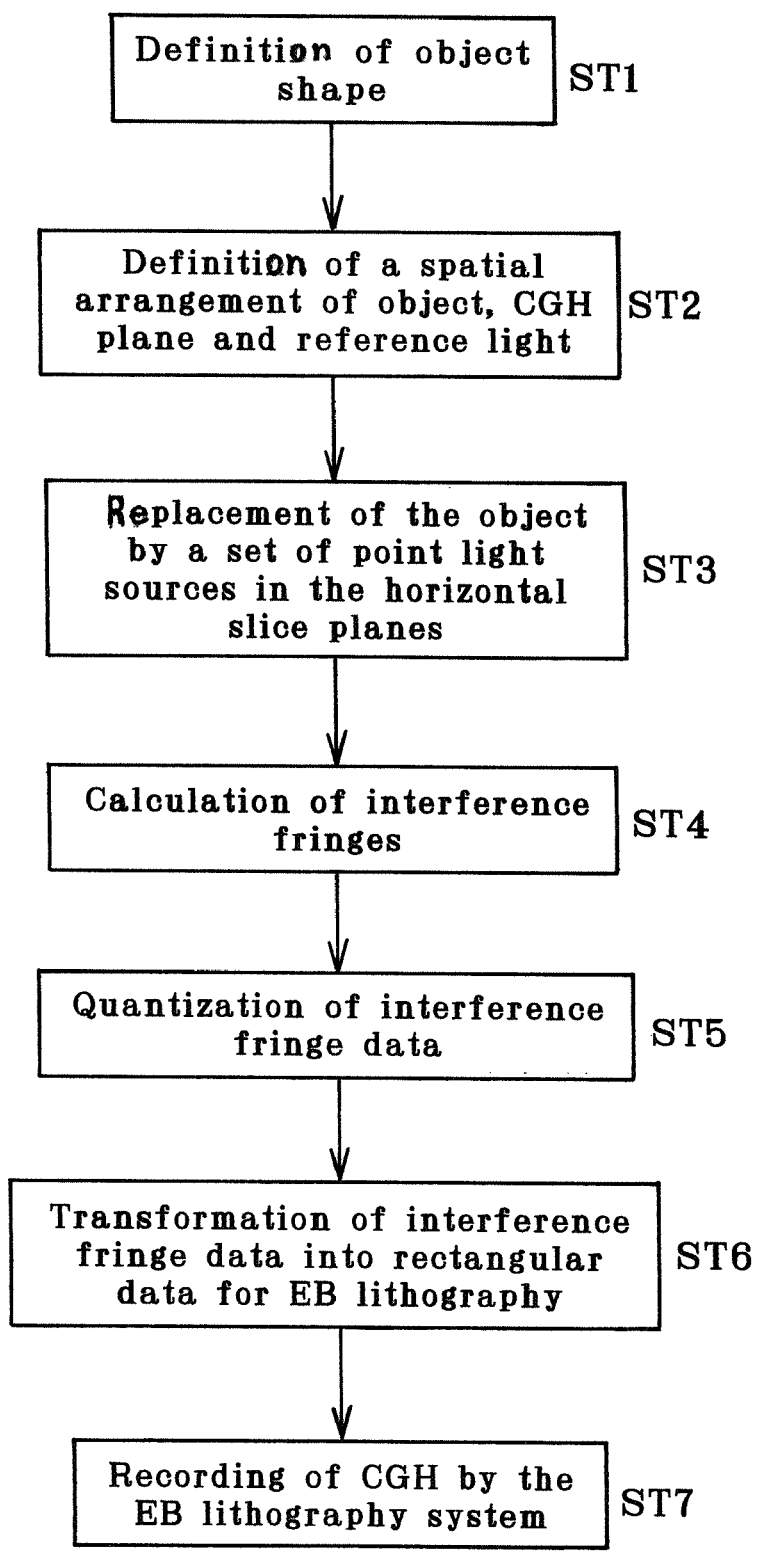
FIG. 5 is a flowchart illustrative in schematic of the process of fabricating the computer-generated hologram according to the invention.

How to fabricate CGHs is well known (from Non-Patent Publication 1 as an example), and so a brief account is given of typically a binary hologram with the intensity distribution of interference fringes recorded in it, wherein a reconstructed image has parallax in the horizontal direction alone and is viewed with white light from above. As shown in FIG. 5, at step ST1, the shape of an object (original image 10) from which a CGH is to be fabricated is defined. Then, at step ST2, the spatial configuration of the object, CGH plane (the recording plane of the recording medium 20) and reference light is defined. Then, at step ST3, the object is divided by horizontal slicing into the aforesaid areas in the vertical direction, and further replaced on the slice planes by a set or array of point light sources. And, at step ST4, on the basis of that spatial configuration, the intensity of interference fringes formed by light coming from the respective point light sources constituting the object and reference light is found by computation at the respective sample points of the areas defined on the CGH plane to obtain interference fringe data. Then, at step ST5, the obtained interference fringe data are quantized, after which, at step ST6, they are transformed into rectangular data for EB lithography. Finally, at step ST7, those data are recorded in the medium by means of an EB lithography system, producing the end CGH.

Figure 14:
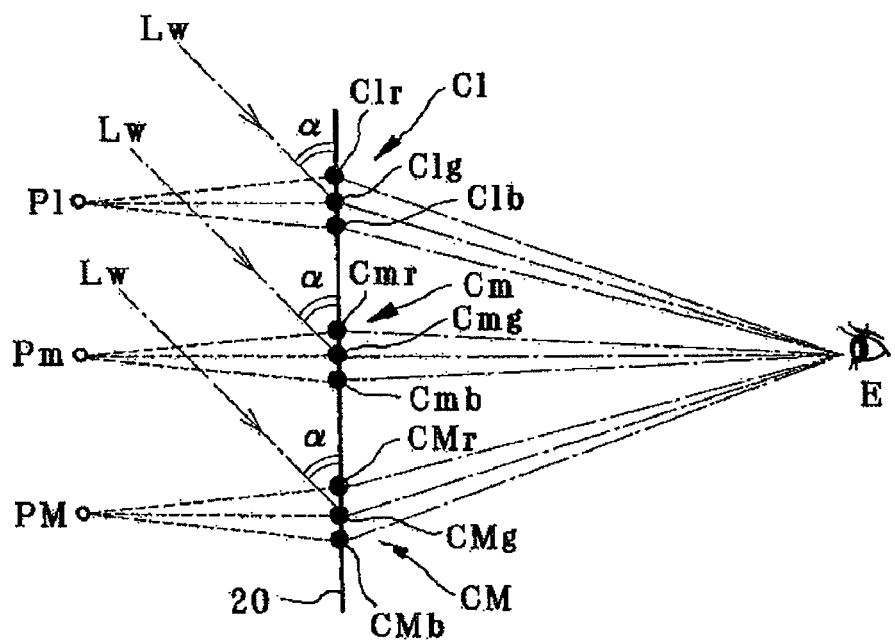
FIG. 14 is a side view illustrative of the color original image recorded by the method of FIG. 11, which is under reconstruction.
Figure 15:
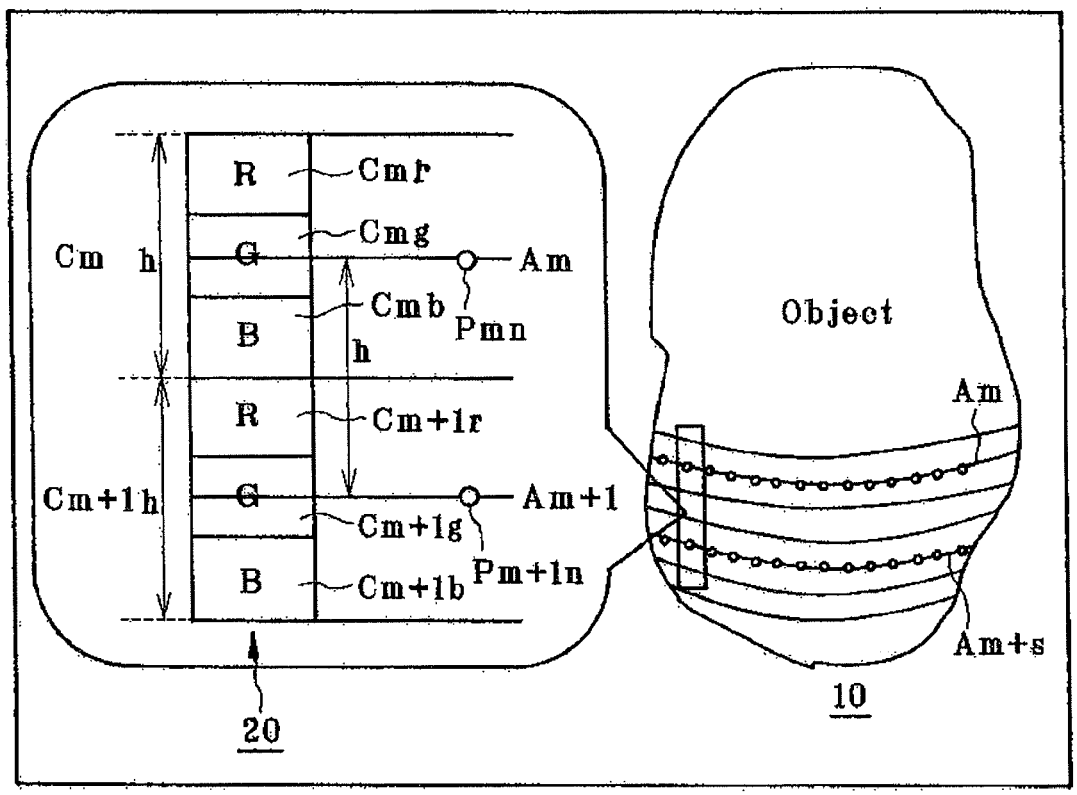
FIG. 15 is illustrative in schematic of a prior art method of fabricating a computer-generated hologram.

In the CGH obtained by the fabrication method of the invention, the resolution of the reconstructed image is determined by the density of the point light sources set at the original image 10; from a comparison of the (inventive) CGH of FIG. 4 with the (prior art) CGH of the FIG. 14, it is found that if the size (width) of the areas Cmr, Cmg, Cmb on the recording medium 20 is the same, it will be possible to record an object having a much finer structure, because, in the case of FIG. 4, the density of point light sources is three times as high, contributing more to higher resolution. However, the reproducibility of color pattern is much the same.

Recording the amplitude and phase of object light at the points of computation Q on the areas may be achieved by not only the aforesaid method of recording interference fringes by interference of object light and reference light, but also any desired method of recording phase with the depth of a groove in a three-dimensional cell having that groove in one surface and amplitude with the width of that groove, as set forth in Patent Publications 2 and 3.

Alternatively, the amplitude and phase may be recorded by the method by A. W. Lohmann et al. or the method by Lee described in Non-Patent Publication 1, or the like.

Further, the colors of point light sources located at the individual areas on the original image 10 are never limited to the three primary colors RGB; combinations of other colors (wavelengths), two colors or four or more colors may be used. Given two colors, the amount of data could be smaller than that could be possible with three colors, and given four or more colors, the range of colors could be wider than could be possible with three colors.

Next, the examples of the invention are explained with reference to comparative examples.

Figure 6A:
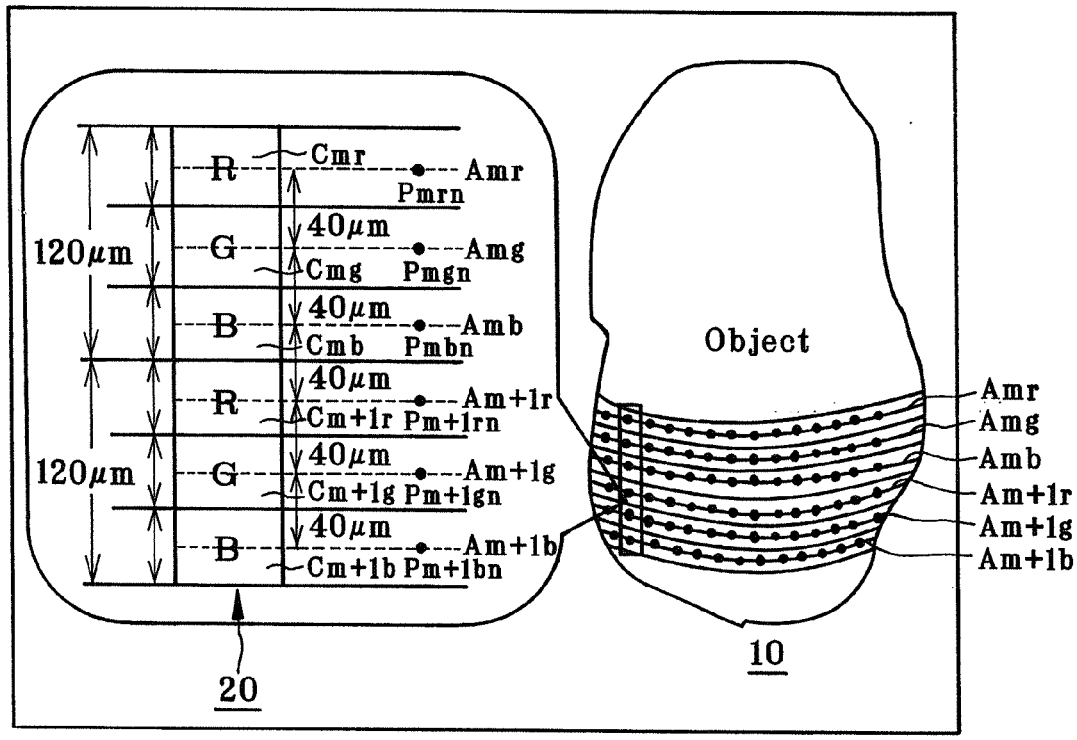
FIG. 6 is illustrative in schematic of a comparison of the inventive example with a comparative example.
Figure 6B:
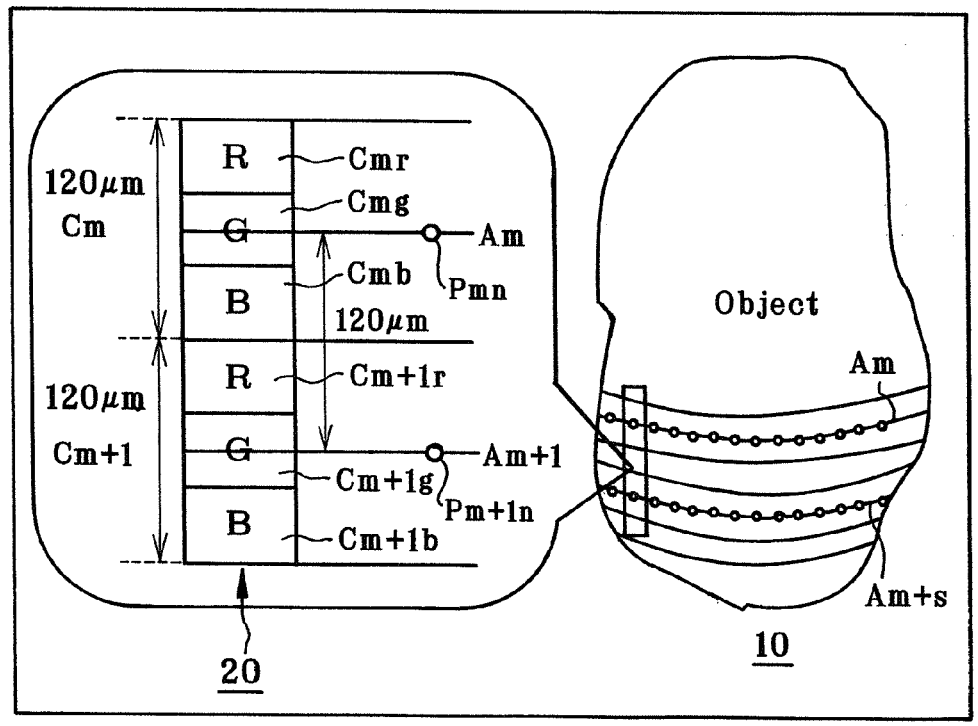

As shown in FIG. 6(b), unit areas, each of 120 µm in size, are recorded in a recording medium by the recording method set forth in Patent Publication 1. Suppose now that one point light source had three colors RGB of information and each area on the recording medium had a size of 40 µm (R: 40 µm, G: 40 µm, B: 40 µm). The point light source will exist at one space in the stretch of 120 µm amounting to the three colors of areas, each of 40 µm. Here, characters of about 1,000 µm to about 1,400 µm recorded in the recording medium could not be read.

As in the invention, on the other hand, suppose now that one point light source had one color of information and each area had a size of 40 µm (R: 40 µm, G: 40 µm, B: 40 µm). There will be one point light source found in the stretch of 40 µm; that is, there will be three point light sources found in 120 µm. The image reconstructed from the computer-generated hologram fabricated by the fabrication method of the invention has the areas of the same size as that reconstructed from the computer-generated hologram fabricated by the fabrication method of Patent Publication 1. According to the invention, however, a hologram having a resolution three times as high could be fabricated. For this reason, characters of about 1,000 µm to about 1,400 µm recorded on the recording medium could be well read.

Next, the method wherein, as contemplated herein, a color image can be reconstructed with higher resolution from a computer-generated hologram, may be applied to other type of computer-generated hologram.

Figure 7:
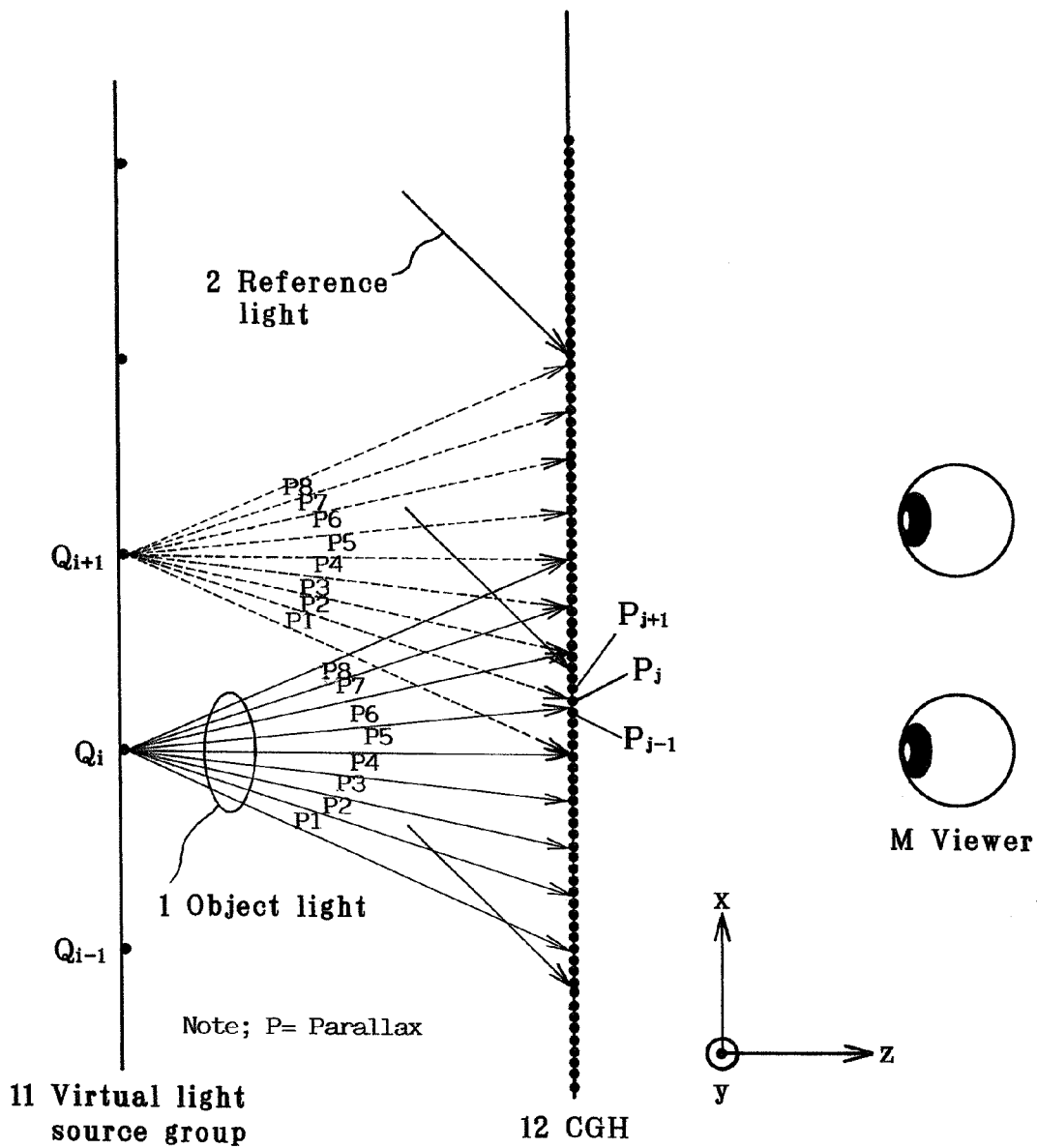
FIG. 7 is illustrative of the principles of another type of computer-generated hologram to which the method of the invention is applicable.

First, the application of the invention to such a computer-generated hologram as proposed in Patent Publication 4 is explained. As shown in FIG. 7, a virtual point light source group 11, a CGH 12 and a viewer M are positioned in order along the z-axis in the plus direction, and the virtual point light source group 11 and the CGH 12 are sectioned off at a multiplicity of slice planes perpendicular to the y axis so that the incidence of an object wave from the virtual point light source $Q_i$ ($x_1$, $y_1$, $z_1$) into the CGH 12 is limited to within the slice planes. In those slice planes, an object wave 1 leaving the virtual point light source $Q_i$ ($x_1$, $y_1$, $z_1$) in the direction of parallax 1 is allowed to have as amplitude the density of the first image $I_1$, for instance, a capital "A" at a pixel position i, and an object light 1 in the direction of parallax 2 is allowed to have as amplitude the density of the second image $I_2$, for instance, a capital "B" at a pixel position i. Similarly, an object light 1 leaving in the direction of parallax 8 is allowed to have as amplitude the density of the eighth image $I_8$, for instance, a capital "H" at a pixel position i. Thus, the object waves 1 having the densities of these capitals "A", "B", . . . , "H" at the pixel positions i at the same time depending on the directions of parallaxes are synthesized. By recording the phase and amplitude of the object waves 1 on holographic, there is the CGH 12 obtained, which is capable of selectively reconstructing images $I_1$, $I_2$, . . . , $I_m$ differing depending on the directions of parallaxes.

That is, there is a computer-generated hologram involved, wherein a virtual point light source group is spatially provided on the side of the hologram facing away from the viewing side of the hologram and a multiplicity of parallel slice planes traversing the plane of the virtual point light source group and the plane of the hologram are provided to divide into angles the angle profile of luminance of divergent light that diverges from individual virtual point light sources in the point light source group in the slice planes toward the viewing side of the hologram in the slice planes, whereby, in each angle, divergent light diverging in the slice planes is found from the density of different images positioned at the plane of the point light source group at the positions of the point light sources or an amplitude equal to a value having a constant relation with that density, so that divergent light set equal to said divergent light is recorded as object light at any position on the side of the group of virtual point light sources on which the divergent light is incident.

Figure 8:
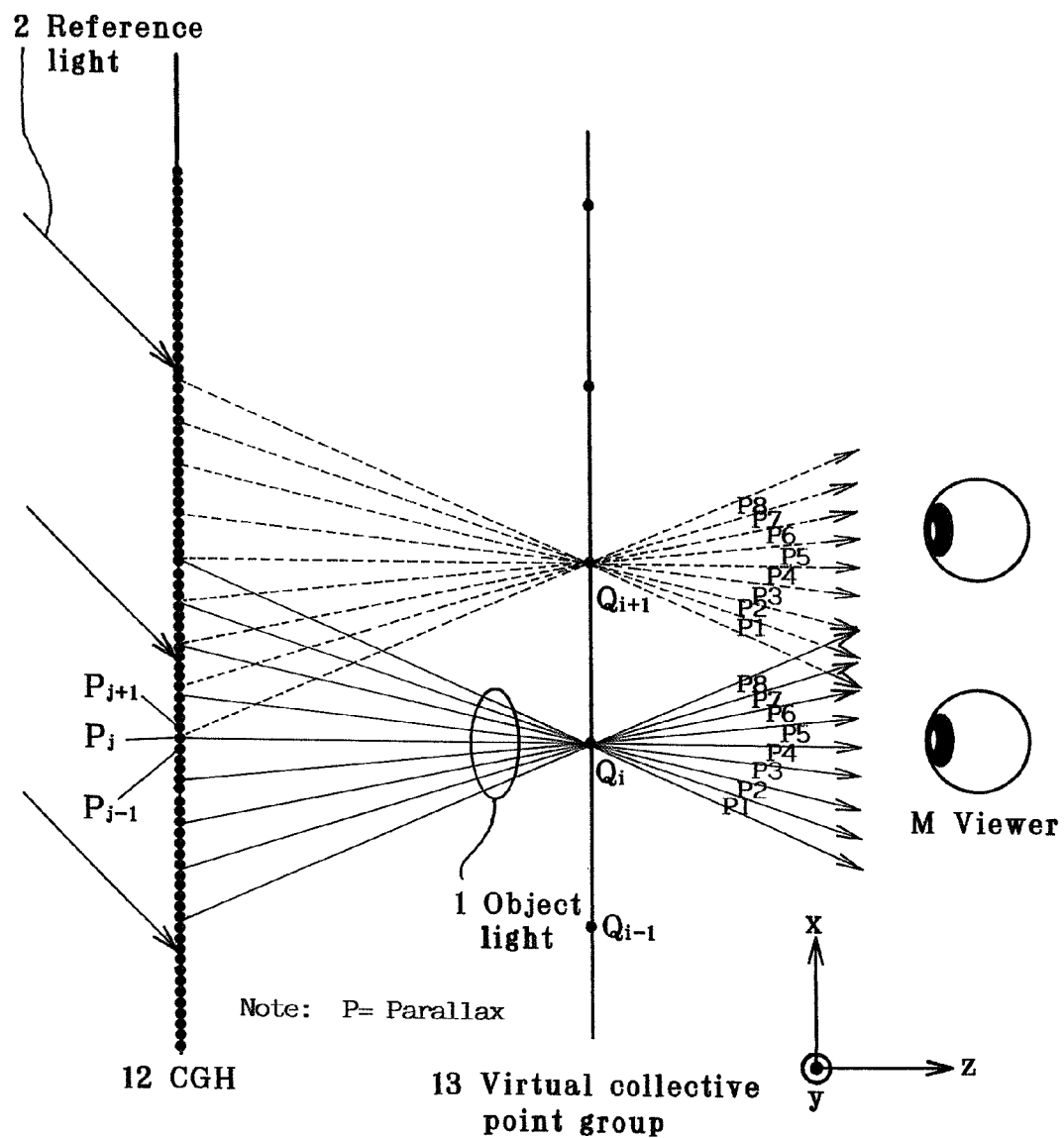
FIG. 8 is illustrative of the principles of yet another type of computer-generated hologram to which the method of the invention is applicable.

With another computer-generated hologram proposed in Patent Publication 4, as shown in FIG. 8, a CGH 12, a virtual collective point group 13 and a viewer M are positioned in order along the z axis in the plus direction, and the CGH 12 and the virtual collective point group 13 are sectioned off at a multiplicity of slice planes perpendicular to the y axis, so that the incidence of object waves from the CGH 12 on a virtual collective point $Q_i$ ($x_1$, $y_1$, $z_1$) is limited to within those slice planes. In the slice planes, an object wave 1 once converged at the virtual collective point $Q_i$ ($x_1$, $y_1$, $z_1$) and leaving in a direction of parallax 1 is allowed to have as amplitude the density of the first image $I_1$, for instance, a capital "A" at a pixel position i, and an object wave 1 leaving in the direction of parallax 2 is allowed to have as amplitude the density of the second image $I_2$, for instance, a capital "B" at a pixel position i. Similarly, an object wave 1 leaving in a direction of parallax 8 is allowed to have as amplitude the density of the eighth image $I_8$, for instance, a capital "H" at a pixel position i. Thus, the object waves 1 having the densities of these capitals "A", "B", . . . , "H" at the pixel positions i at the same time depending on the directions of parallaxes are synthesized. By recording the phase and amplitude of those object waves 1 on holographic, there is the CGH 12 obtained, which is capable of selectively reconstructing images $I_1$, $I_2$, . . . , $I_m$ differing depending on the directions of parallaxes.

That is, there is a computer-generated hologram involved, wherein a virtual collective point group is spatially provided on the viewing side of the hologram and a multiplicity of parallel slice planes traversing the plane of the virtual collective point group and the plane of the hologram are provided to divide into angles the angle profile of luminance of convergent light that is incident from the side of the hologram facing away from the viewing side on individual virtual collective points in the virtual collective point group in the slice planes, whereby, in each angle, there is convergent light found, which converges on a point having a density of different images positioned at the plane of the virtual collective point group at the positions of the virtual collective points or an amplitude equal to a value having a constant relation with that density, so that convergent light set equal to said convergent light is used as object light and recorded at any position on the side of the virtual collective point group on which the convergent light is incident.

To enable a full-color image to be recorded in or reconstructed from such a computer-generated hologram as proposed in Patent Publication 4, an area at which the plane of the CGH 12 intersects each slice plane is divided into three sub-areas parallel with that slice plane, as explained with reference to FIGS. 11 to 15. On the other hand, light of three colors RGB is allowed to diverge from the virtual point light source $Q_i$ ($x_1$, $y_1$, $z_1$) so that the R, G, B color components are separately incident on the three sub-areas for recording or, alternatively, the respective R, G, B color components from the three sub-areas on the CGH 12 are allowed to collect on the virtual point light source $Q_i$ ($x_1$, $y_1$, $z_1$). However, it is understood that when it is intended to record a finely structured object in the recording medium as is the case with the computer-generated hologram of FIGS. 11 to 15, the resolution is limited to the width of the unit area once preset on the recording medium.

It is therefore preferable that the density of slice planes perpendicular to the y axis are tripled to assign RGB to the multiplicity of slice planes periodically in the direction perpendicular to those slice planes so that in a slice plane for R, light diverging from virtual point light sources or collecting on virtual collective points gives out color R; in a slice plane for G, light diverging from virtual point light sources or collecting on virtual collective points gives out color G; and in a slice plane for B, light diverging from virtual point light sources or collecting on virtual collective points gives out color B. It is here noted that the resolution of the reconstructed image is determined by the density of point light sources located in the virtual point light source group 11 or collective points located in the virtual collective point group 13, as is the case with the computer-generated hologram of FIGS. 1 to 4. If the size (width) of the areas on the plane of the CGH 12 is the same, it will be possible to record an object having a much finer structure, because the density of point light sources or collective points is three times as high, contributing more to higher resolution. However, the reproducibility of color pattern is much the same.

That is, there is a computer-generated hologram involved, which has the complex amplitude of object light recorded therein, and is capable of selectively reconstructing a plurality of images depending on a viewing direction, wherein a virtual point light source group is spatially provided on the side of the hologram facing away from the viewing side of the hologram and a multiplicity of parallel slice planes traversing the plane of the virtual point light source group and the plane of the hologram are provided; light having a plurality of different wavelengths periodically varying in the direction orthogonal to the slice planes is assigned to the multiplicity of slice planes; in each slice plane, light diverging from virtual point light sources is allowed to have the assigned wavelengths; the angle profile of luminance of divergent light that diverges from the respective virtual point light sources in the virtual point light source group in the slice planes toward the viewing side in the slice planes is divided into angles; in each angle, there is divergent light that diverges in the slice planes from a point having a density of a wavelength corresponding to pixels of separate images positioned at the plane of the virtual point light source group at the virtual point light source position or an amplitude equal to a value having a constant relation to said density, so that divergent light set equal to said divergent light is recorded as object light at any position of the side of the virtual point light source group on which the divergent light is incident.

In the invention, there is another computer-generated hologram involved, which has the complex amplitude of object light recorded therein, and is capable of selectively reconstructing a plurality of images depending on a viewing direction, wherein a virtual collective point group is spatially provided on the side of the hologram facing away from the viewing side of the hologram and a multiplicity of parallel slice planes traversing the plane of the virtual collective point group and the plane of the hologram are provided; light having a plurality of different wavelengths varying periodically in the direction orthogonal to the slice planes is assigned to the slice planes; in each slice plane, light collecting on virtual collective points is allowed to have the assigned wavelengths; the angle profile of luminance of convergent light that is incident on the respective virtual collective points in the virtual collective point group in the slice planes from the side of the hologram facing away from the viewing side of the hologram in the slice planes is divided into angles; in each angle, there is convergent light that converges in the slice plane on a point having a density of a wavelength corresponding to pixels of separate images positioned at the plane of the virtual collective point group at a virtual collective point position or an amplitude equal to a value having a constant relation to said density, so that convergent light set equal to said convergent light is recorded as object light at any position of the side of the virtual collective point group on which the convergent light is incident.

Figure 9:
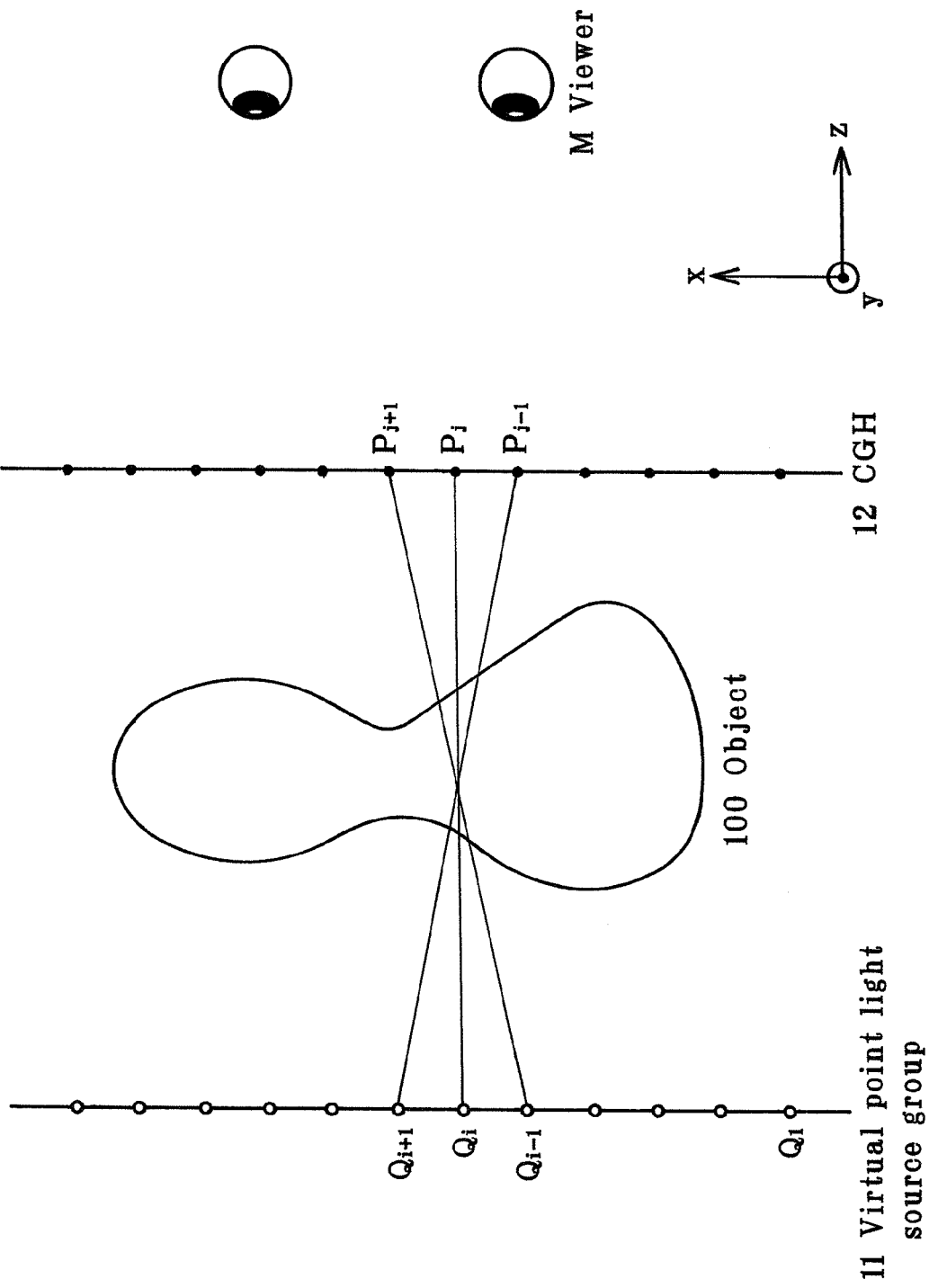
FIG. 9 is illustrative of the principles of a further type of computer-generated hologram to which the method of the invention is applicable.

Next, the application of the invention to the computer-generated hologram proposed in Patent Publication 5 is explained. As shown in FIG. 9, a virtual point light source group 11, an object 100, a CGH 12 and a viewer M are positioned in order along the z axis in the plus direction, and the virtual point light source group 11, object 100 and CGH 12 are sectioned off at a multiplicity of slice planes perpendicular to the y axis so that the incidence of object waves from a virtual point light source $Q_i$ ($x_1$, $y_1$, $z_1$) on the CGH 12 is limited to within slice planes. In the slice planes, a multiplicity of virtual point light sources $Q_i$ ($x_1$, $y_1$, $z_1$) are provided on the side of the three-dimensional object 100 facing away from its viewing side, wherein that object can be recorded and reconstructed as the CGH 12. Then, the angle profile of luminance of divergent light diverging from each virtual point light source $Q_i$ is set equal to the angle profile of luminance on the surface of the three-dimensional object 100 when the virtual point light source $Q_i$ is viewed from the viewing side through the three-dimensional object 100. Then, divergent light from such virtual point light source $Q_i$ is mutually superposed on the plane of the CGH 12. Finally, by recording the superposed phase and amplitude in holographic, there is the CGH 12 obtainable, which is capable of reconstructing the three-dimensional object 100.

That is, there is a computer-generated hologram involved, wherein a virtual point light source group is spatially provided on the side of the hologram facing away from the viewing side of the hologram and a multiplicity of parallel slice planes traversing the plane of the virtual point light source group and the plane of the hologram are provided; the angle profile of luminance of divergent light that diverges from the individual virtual point light sources in the virtual point light source group in the slice planes toward the viewing side in the slice planes is set equal to the angle profile of luminance on the surface of an object to be recorded when said virtual point light sources are viewed from the viewing side in the slice plane; and divergent light that diverges from the individual virtual point light sources is mutually superposed on itself and recorded as object light at any position on the viewing side of the virtual point light source group.

Figure 10:
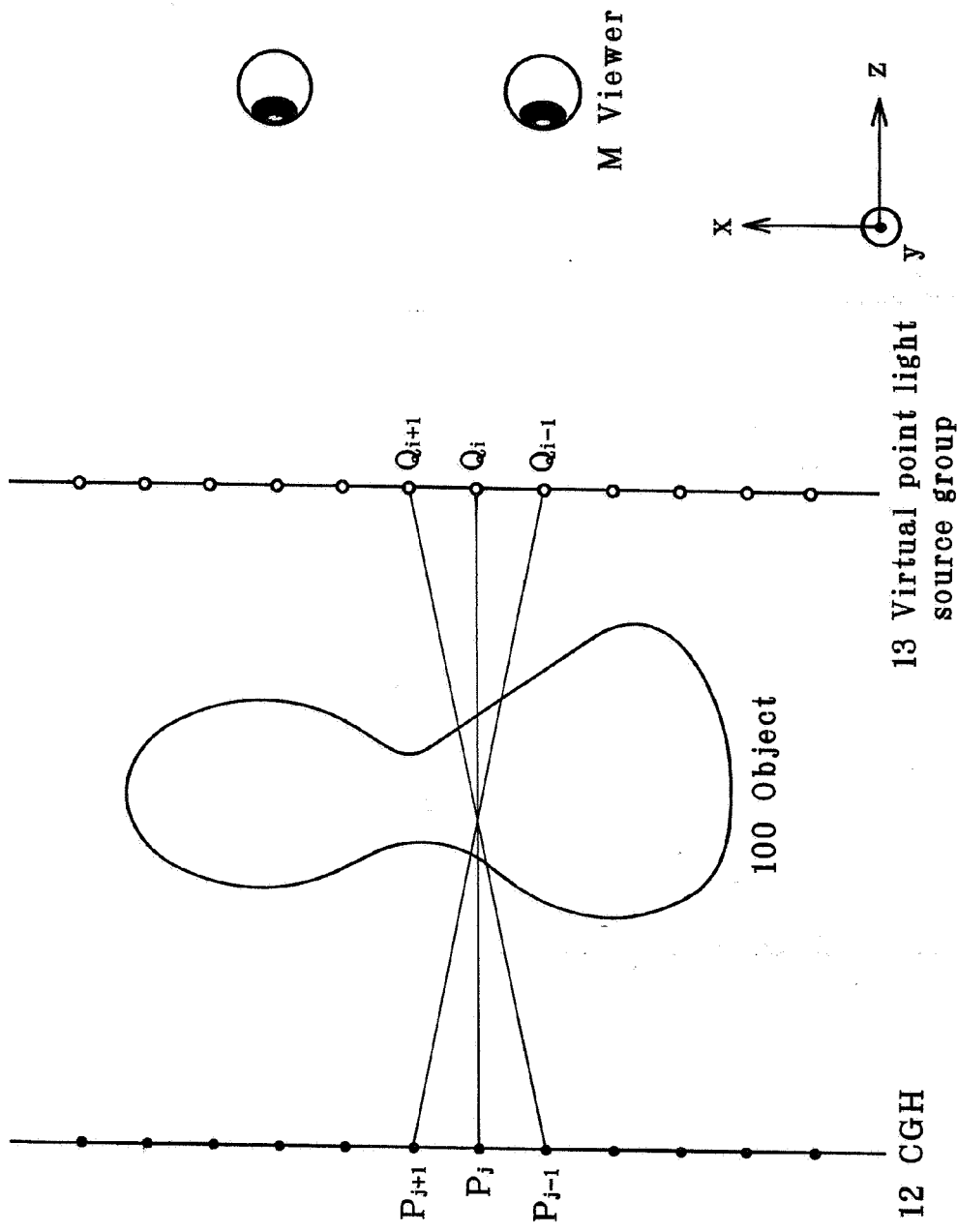
FIG. 10 is illustrative of the principles of a further type of computer-generated hologram to which the method of the invention is applicable.
Figure 13:
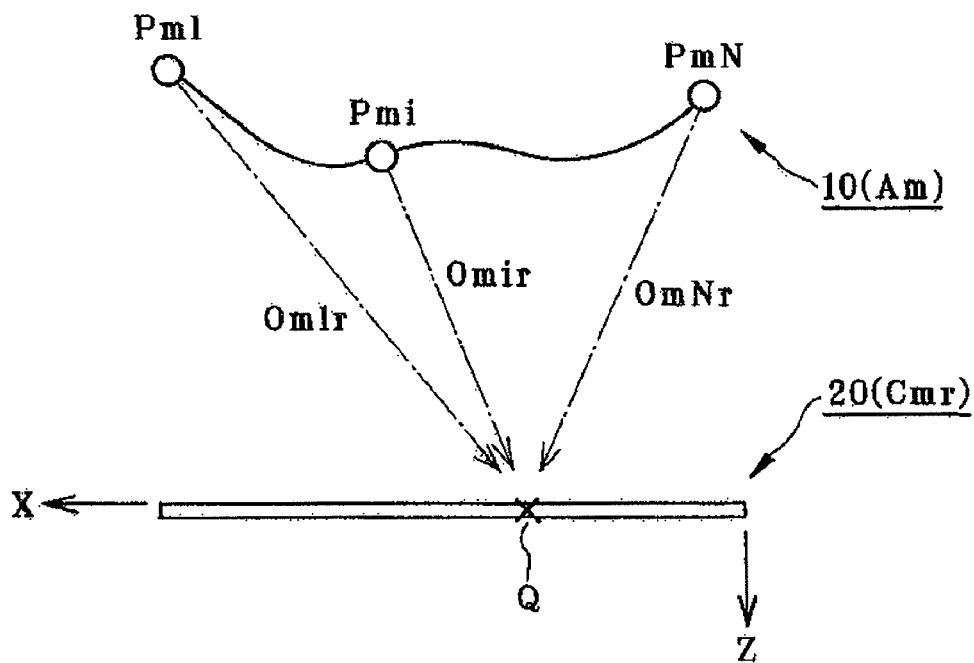
FIG. 13 is a top view of the conception of computation processing in FIG. 11.

In another computer-generated hologram proposed in Patent Publication 5, as shown in FIG. 10, a CGH 12, an object 100, a virtual collective point group 13 and a viewer M are positioned in order along the z axis in the plus direction, and the object 100, CGH 12 and virtual collective point group 13 are sectioned off at a multiplicity of slice planes perpendicular to the y axis so that the incidence of object waves from the CGH 12 on the virtual collective point $Q_i$ ($x_1$, $y_1$, $z_1$) is limited to within that slice planes. In the slice planes, a multiplicity of virtual collective points $Q_i$ ($x_1$, $y_1$, $z_1$) are provided on the side of the three-dimensional object 100 facing away from its viewing side, wherein that object can be recorded and reconstructed as the CGH 12. Then, the angle profile of luminance of convergent light incident from the object side on each virtual point light source $Q_i$ is set equal to the angle profile of luminance on the surface of the three-dimensional object 100 when the three-dimensional object 100 is viewed from the viewing side through the virtual collective point $Q_i$. Then, convergent light incident on such virtual collective points $Q_i$ is mutually superposed on itself. Finally, by recording the superposed phase and amplitude in holographic, there is the CGH 12 obtainable, which is capable of reconstructing the three-dimensional object 100.

That is, there is a computer-generated hologram involved, wherein a virtual collective point group is spatially provided on the viewing side of the hologram and a multiplicity of parallel slice planes traversing the plane of the virtual collective point group and the plane of the hologram are provided; the angle profile of luminance of convergent light that is incident on the individual virtual collective points in the virtual collective point group in the slice planes from the side of the hologram facing away from the viewing side of the hologram is set equal to the angle profile of luminance on the surface of an object to be recorded when viewed from the viewing side in the slice plane through said virtual collective points; and convergent light that is incident on the individual virtual collective points is mutually superposed on itself and recorded as object light at any position on the side of the virtual collective point group facing away from the viewing side thereof.

In this case, too, it is therefore preferable that, as in FIGS. 7 and 8, the density of slice planes perpendicular to the y axis are tripled to assign RGB to the multiplicity of slice planes periodically in the direction perpendicular to those slice planes so that in a slice plane for R, light diverging from virtual point light sources or collecting on virtual collective points gives out color R; in a slice plane for G, light diverging from virtual point light sources or collecting on virtual collective points gives out color G; and in a slice plane for B, light diverging from virtual point light sources or collecting on virtual collective points gives out color B. It is here noted that the resolution of the reconstructed image is determined by the density of point light sources located in the virtual point light source group 11 or collective points located in the virtual collective point group 13, as is the case with the computer-generated hologram of FIGS. 1 to 4. If the size (width) of the areas on the plane of the CGH 12 is the same, it will be possible to record an object having much finer structure, because the density of point light sources or collective points is three times as high, contributing more to higher resolution. However, the reproducibility of color pattern is much the same.

That is, there is a computer-generated hologram involved, which has the complex amplitude of object light recorded therein and is capable of reconstructing a stereoscopic object, wherein a virtual point light source group is spatially provided on the side of the hologram facing away from the viewing side of the hologram and a multiplicity of parallel slice planes traversing the plane of the virtual point light source group and the plane of the hologram are provided; light having a plurality of different wavelengths varying periodically in the direction orthogonal to the slice planes is assigned to the multiplicity of slice planes; in each slice plane, light diverging from virtual point light sources is allowed to have the assigned wavelengths; the angle profile of luminance of divergent light that diverges from the individual virtual point light sources in the virtual point light source group in the slice planes toward the viewing side of the hologram in the slice planes is set equal to the angle profile of luminance on the surface of an object to be recorded when said virtual point light sources are viewed from the viewing side in the slice planes; and divergent light that diverges from the individual virtual point light sources is mutually superposed together and recorded as object light at any position on the viewing side of the virtual point light source group.

There is another computer-generated hologram involved, which has the complex amplitude of object light recorded therein and is capable of reconstructing a stereoscopic object, wherein a virtual collective point group is spatially provided on the viewing side of the hologram and a multiplicity of parallel slice planes traversing the plane of the virtual collective point group and the plane of the hologram are provided; light having a plurality of different wavelengths varying periodically in the direction orthogonal to the slice planes is assigned to the multiplicity of slice planes; in each slice plane, light diverging from virtual collective points is allowed to have the assigned wavelengths; the angle profile of luminance of convergent light that is incident on the individual virtual collective points in the virtual collective point group in the slice planes from the side of the hologram facing away from the viewing side of the hologram is set equal to the angle profile of luminance of a corresponding wavelength on the surface of an object to be recorded when viewed in the slice planes from the viewing side of the hologram through said virtual collective points; and convergent light that is incident on the individual virtual collective points is mutually superposed together and recorded as object light at any position on the side of the virtual collective point group facing away from the viewing side thereof.

While the computer-generated hologram and its fabrication method of the invention have been described with reference to several specific embodiments or examples, it is contemplated that the invention is never limited to them and so could be modified in various embodiments.

What we claim is:

1. A method of fabricating a computer-generated hologram with amplitude information and phase information recorded on a given recording plane by computer-aided computation, the method comprising:
    a step of defining a given original image and a recording plane for recording said original image;
    a step of dividing said original image and said recording plane by a multiplicity of parallel sections into a multiplicity of linear areas in a horizontal direction, thereby defining said areas in such a way that areas of said original image have a one-to-one matching relation to areas of said recording plane;
    a step of periodically arranging on the multiplicity of areas of said original image a point or line segment light source array emitting light having a plurality of wavelengths in such a way that a wavelength of light emitted out of the multiplicity of areas varies periodically in a direction traversing the multiplicity of areas of said original image;
    a step of defining a multiplicity of computation points on the areas of said recording plane to compute the amplitude information and the phase information about object light on individual computation points, wherein said object light is synthetic light arriving from corresponding points of the areas of said original image or individual point or line segment light sources of said point or line segment light source array; and
    a step of recording on a recording medium amplitude information and phase information found on the individual computation points.

2. The method of fabricating a computer-generated hologram according to claim 1, further comprising the step of recording on a recording medium amplitude information and phase information found on the individual computation points, interference fringes of object light and reference light at the computation points are recorded on the recording medium.

3. The method of fabricating a computer-generated hologram according to claim 1, characterized in that at the step of recording on a recording medium amplitude information and phase information found on the individual computation points, a phase is recorded with a depth of a groove in a three-dimensional cell having said groove in one surface and an amplitude is recorded with a width of said groove.

4. The method of fabricating a computer-generated hologram according to claim 1, characterized in that the plurality of wavelengths of light emitted out of the point or line segment light source array periodically arranged on the multiplicity of areas of said original image is three, one for red, another for green, and yet another for blue.

5. A computer-generated hologram fabricated by the method of fabricating a computer-generated hologram according to claim 1.

6. A method of fabricating a computer-generated hologram by recording an original image on a recording plane, the method comprising:
    dividing said original image and said recording plane into a plurality of parallel areas such that each of said plurality of areas of said original image has a corresponding area in said plurality of areas of said recording plane;
    periodically arranging in each of the plurality of areas of said original image a light source array emitting light such that a wavelength of light emitted from the plurality of areas varies periodically in a direction traversing the plurality of areas of said original image;
    defining a multiplicity of computation points on the plurality of areas of said recording plane to compute amplitude information and phase information about object light on individual computation points; and
    recording on the recording medium the amplitude information and the phase information computed on the individual computation points.

* * * * *